Dec. 17, 1929.  W. H. PIERSON  1,739,691
WELDING APPARATUS
Filed March 5, 1928
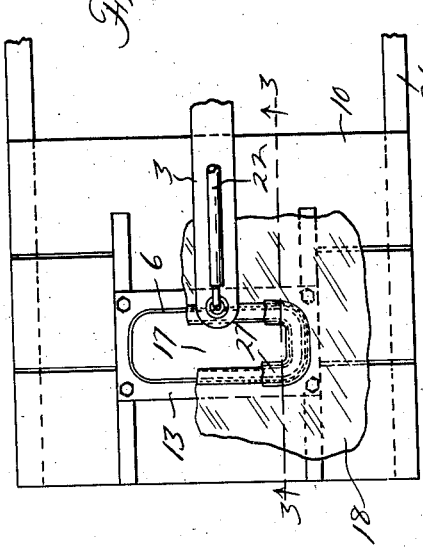
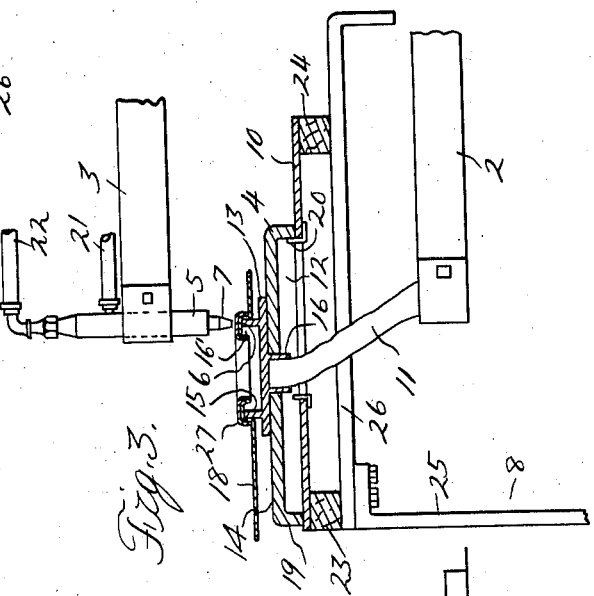
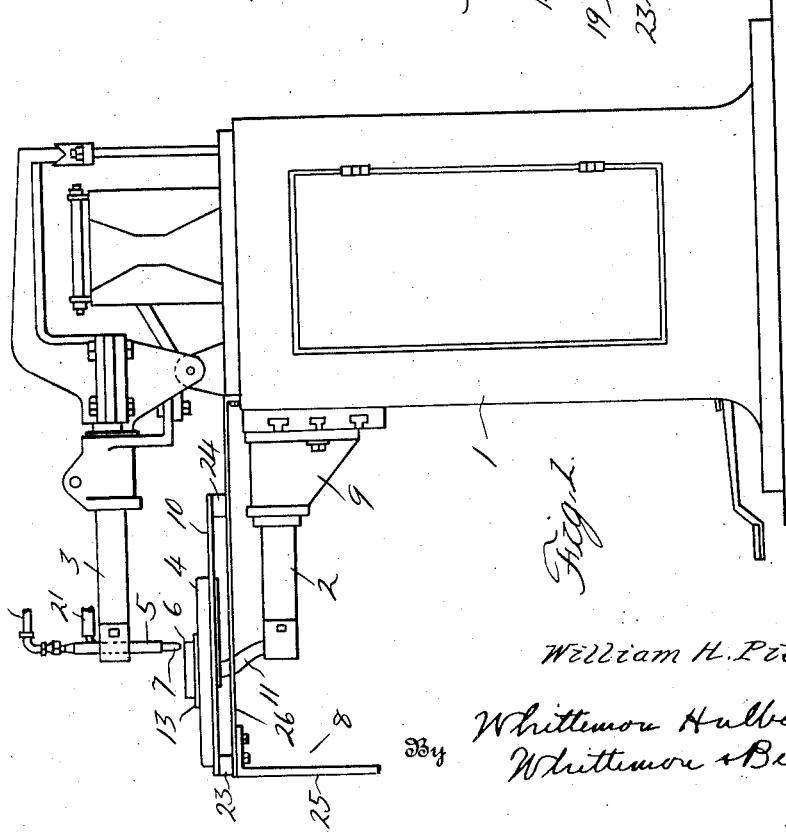
Inventor
William H. Pierson
By Whittemore Hulbert
Whittemore & Belknap
Attorneys Patented Dec. 17, 1929

1,739,691

UNITED STATES PATENT OFFICE

WILLIAM H. PIERSON, OF DETROIT, MICHIGAN, ASSIGNOR TO BRIGGS MANUFACTURING COMPANY, OF DETROIT, MICHIGAN, A CORPORATION OF MICHIGAN

WELDING APPARATUS

Application filed March 5, 1928. Serial No. 259,324.

This invention relates generally to electric welding apparatus, and refers more particularly to the welding points and supports therefor of such apparatus.

Heretofore, it has been very difficult to weld the bases of narrow channels or depressions in sheet metal to other parts without burning the sides of such channels when the welding points were inserted in the channels to engage the bases thereof. For example, in welding the bases of narrow channel shaped gutters surrounding ventilator openings in cowls to the cowl ventilator supporting frames or brackets, the usual welding points could not be inserted into the narrow metal channels to weld the bases of said channels to other parts such as to the ventilator supporting frames without burning the sides of the channels. Moreover, the operator had no way of determining definitely or accurately how to position the parts so that the frames to be welded to the bases of the channel gutters would be engaged at the proper point to affect the desired welds. As a result, such welding operations were very unsatisfactory and costly, as there was considerable damage to the metal parts being welded, and aside from parts destroyed or wasted outright it required much time and labor to repair the damaged parts.

With the present invention, however, the objectionable features just referred to have been overcome entirely by the provision of a horizontally slidable or floating electrode welding point that is shaped to fit in the narrow channel gutter surrounding the ventilator opening in the cowl in such a way that the base of the channel gutter and the ventilator frame can be welded together easily, quickly and accurately and without damage to either part.

In the accompanying drawings:

Figure 1 is a side elevation of a welding apparatus embodying my invention;

Figure 2 is a fragmentary top plan view of the construction shown in Figure 1;

Figure 3 is a fragmentary vertical sectional view taken on the line 3—3 of Figure 2.

Referring now to the drawing, 1 is the main frame, 2 and 3 respectively are vertically spaced substantially horizontally disposed electric conductor bars projecting laterally from said frame, 4 and 5 respectively are vertically spaced electrodes, 6 and 7 respectively are cooperating welding points, and 8 is an auxiliary frame of a welding apparatus embodying my invention. As shown, the frame 1 is of conventional form and houses the usual transformer. The bars 2 and 3 are likewise of conventional form except that in the present instance the lower bar 2 does not hold an upright electrode such as 5. However, the lower bar 2 is rigid with the saddle 9 on the main frame 1, and the upper bar 3 is pivotally mounted on the said main frame so as to swing toward and from the work. The upper electrode 5 is vertically arranged as usual and is clamped in the arm 3 at the outer end thereof, while the lower electrode 4 is inverted channel shaped in form and is preferably free to slide over the top 10 of the auxiliary frame 8. The welding point 7 is of conventional form and is rigid with the electrode 5, while the welding point 6 is rigid with the electrode 4 but is electrically connected to the bar 2 by means of a suitable cable 11 that extends through an opening 12 in the auxiliary frame top 10. Preferably this welding point 6 has a flat base 13 resting on the flat base 14 of the inverted channel shaped electrode 4 and is provided upon the upper and lower faces of its base with upstanding and depending flanges 15 and 16 respectively. As shown, the upstanding flanges 15 form a substantially rectangular shaped frame and are designed to fit accurately within the narrow channel shaped gutter 16 surrounding the ventilator opening 17 in the cowl 18, while the lower flanges 16 extend through the base 14 of the electrode 4 and are rigidly secured to the upper end of the cable 11. Thus, with this construction, the channel shaped electrode 4 is free to slide over the top 10 of the auxiliary frame so as to permit the parts to be welded to be properly placed upon the welding point 6 and to enable the said parts and welding point 6 to be properly moved as a unit to the proper point beneath the welding point 7 to obtain the desired weld.

If desired, metal strips 20 of L cross section may be rigidly secured to the auxiliary frame top 10 around the edges of the opening 12 therein so as to project above the top and serve as stops for the depending flanges 19 of the channel electrode 4. Moreover, a suitable cooling fluid such as water may be conducted to and from the electrode 5 by means of suitable conduits 21 and 22 respectively. It will also be noted that the top 10 is insulated by wooden supports 23 and 24 from the supporting legs 25 and cross bars 26 of the auxiliary frame.

In use, the cowl 18 is placed upside down so that the upstanding flanges 15 of the welding point are within the channel shaped gutter 16, the ventilator bracket 27 is then placed upon the base of the gutter, whereupon the parts 18, 27, 4 and 6 are moved as a unit on the auxiliary frame top 10 to position the side and end bars of the ventilator frame beneath the welding point 7. When the latter is lowered into engagement with said ventilator frame an accurate weld may be obtained between said frame and the base of the channel gutter in the cowl without damage to any of the parts.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a welding apparatus, the combination with an upright electrode and a welding point at one end thereof, of a co-operating electrode shiftable in a plane disposed at substantially right angles to the upright electrode, and a welding point carried by the last mentioned electrode having flanges adapted to be alternately positioned in substantial alignment with the welding point aforesaid of the first mentioned electrode when the second mentioned electrode is shifted.

2. In a welding apparatus, the combination with a main frame, and electrical conductor bars projecting laterally therefrom, of an electrode carried by one of said bars, a welding point carried by the last mentioned electrode for co-operation with the welding point aforesaid, and a flexible electrical connection between the last mentioned electrode and the last mentioned bar.

3. In a welding apparatus, the combination with a main frame, and electrical conductor bars projecting laterally therefrom, of an auxiliary frame having a rigid top disposed between said conductor bars, an electrode carried by one of said bars, a welding point carried by said electrode, a co-operating electrode shiftably mounted upon the top aforesaid of said auxiliary frame, a welding point carried by the last mentioned electrode, and a flexible connection between the last mentioned welding point and the other of said conductor bars.

4. In a welding apparatus, the combination with a main frame, and a pair of vertically spaced electrical conductor bars projecting laterally therefrom, of an auxiliary frame having a top disposed between said bars, said top having an opening therethrough, a welding point carried by the bar disposed above said top, a welding point shiftably mounted upon said top beneath the welding point aforesaid, and an electrical connection between said last mentioned welding point and the bar disposed below said top, including means extending through the opening aforesaid in said top.

5. In a welding apparatus, the combination with a frame having a substantially flat top, of an inverted substantially channel shaped electrode slidably mounted upon said top, and a welding point carried by the base of the channel shaped electrode.

6. In a welding apparatus, a welding electrode having a substantially flat portion, and having depending flanges at spaced points of said flat portion, a welding point having a portion disposed upon the flat portion of said electrode and having an upstanding flange for co-operation with another welding point, and a support for said electrode permitting the latter to shift relative thereto.

7. In a welding apparatus, the combination with a frame having a rigid substantially flat top, a welding electrode slidably mounted upon said top, and a welding point having a portion disposed upon the electrode aforesaid and having upstanding and depending flanges, said depending flanges projecting through said electrode and serving as a terminal for an electrical conductor.

8. In a welding apparatus, the combination with a frame having a substantially flat top, of an inverted substantially channel shaped electrode slidably mounted on said flat top, a welding point carried by said electrode, an electrical conductor bar, and an electrical connection between said bar and point including means associated with said electrode.

9. In a welding apparatus, the combination with a frame having a substantially flat top, of a welding point having a base and upstanding work engaging flanges, and a support for said point including an electrode connected to said base and slidable over the top aforesaid of said frame.

10. In a welding apparatus, the combination with a frame having a substantially flat top, of an inverted substantially channel shaped electrode slidable on said top, and an upstanding work engaging flange on the base of said channel shaped electrode and constituting a welding point.

In testimony whereof I affix my signature.

WILLIAM H. PIERSON.